US011066975B2

(12) United States Patent
Nienhoff et al.

(10) Patent No.: US 11,066,975 B2
(45) Date of Patent: Jul. 20, 2021

(54) METHOD AND DEVICE FOR DIAGNOSIS OF A PARTICLE FILTER ARRANGED IN THE EXHAUST GAS SYSTEM OF A PETROL-OPERATED INTERNAL COMBUSTION ENGINE

(71) Applicant: Vitesco Technologies GMBH, Hannover (DE)

(72) Inventors: Michael Nienhoff, Regensburg (DE); Hao Chen, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/716,721

(22) Filed: Dec. 17, 2019

(65) Prior Publication Data

US 2020/0200062 A1    Jun. 25, 2020

(30) Foreign Application Priority Data

Dec. 19, 2018  (DE) .................... 10 2018 222 249.5

(51) Int. Cl.
*F01N 11/00* (2006.01)
*F01N 9/00* (2006.01)
(Continued)

(52) U.S. Cl.
CPC ............ *F01N 9/002* (2013.01); *F01N 11/002* (2013.01); *F01N 3/023* (2013.01); *F01N 3/035* (2013.01);
(Continued)

(58) Field of Classification Search
CPC .................. F01N 9/002; F01N 11/002; F01N 2900/0418; F01N 3/023; F01N 2900/1606;
(Continued)

(56) References Cited

U.S. PATENT DOCUMENTS 5,715,678 A * 2/1998 Aronica ................ F01N 11/007
60/276
10,619,546 B2 * 4/2020 Inoue ...................... F01N 3/023
(Continued)

FOREIGN PATENT DOCUMENTS

DE         19518528 A1    1/1996
DE     102010063383 A1    6/2012
(Continued)

OTHER PUBLICATIONS

Tietze, U. et al. Halbleiter-Schaltungstechnik, 2002 , 1046-1047, vol. 12, Spring, ISBN/ISSN3540428496, Munich, Germany.
(Continued)

*Primary Examiner* — Matthew T Largi

(57) ABSTRACT

A method for determining a presence of a particle filter in the exhaust gas tract of a petrol-operated internal combustion engine comprises: determining a measured differential pressure curve from a first pressure curve measured in the exhaust gas tract using a first pressure sensor arranged upstream of an installation position of the particle filter, and a second pressure curve measured using a second pressure sensor arranged downstream of an installation position determining a first result curve with a first low-pass filtration of the measured differential pressure curve; determining a second result curve by means of a second low-pass filtration of the first result curve; determining a first differential result curve by forming the difference between the first result curve and the second result curve; determining a first amount result curve by forming the amount of the first differential result curve; determining an expected differential pressure curve.

21 Claims, 3 Drawing Sheets

(51) Int. Cl.
 *F02D 41/02* (2006.01)
 *F01N 3/023* (2006.01)
 *F01N 3/035* (2006.01)
(52) U.S. Cl.
 CPC ...... *F01N 2550/04* (2013.01); *F01N 2560/08* (2013.01); *F01N 2900/0404* (2013.01); *F01N 2900/0418* (2013.01); *F01N 2900/1606* (2013.01); *F02D 41/029* (2013.01); *F02D 2200/0812* (2013.01)
(58) Field of Classification Search
 CPC .. F01N 2560/08; F01N 2550/04; F01N 3/035; F02D 41/029; F02D 2200/0812
 See application file for complete search history.

(56) References Cited

U.S. PATENT DOCUMENTS

| | | | | |
|---|---|---|---|---|
| 2005/0138921 A1* | 6/2005 | Hashimoto | ........... | F01N 13/017 60/297 |
| 2005/0268597 A1* | 12/2005 | Kosaka | .................. | F01N 9/005 60/277 |
| 2012/0023911 A1* | 2/2012 | Liu | ........................ | F01N 11/005 60/277 |
| 2014/0033679 A1* | 2/2014 | Sarsen | ................ | F02D 41/1448 60/274 |
| 2015/0020504 A1* | 1/2015 | Nicole | .................. | F01N 13/008 60/274 |
| 2016/0186636 A1* | 6/2016 | Odendall | .............. | F01N 11/002 60/273 |
| 2019/0063284 A1* | 2/2019 | Santillo | .................. | F01N 3/021 |

FOREIGN PATENT DOCUMENTS

| | | |
|---|---|---|
| DE | 102011002438 A1 | 7/2012 |
| DE | 102014019642 A1 | 6/2016 |
| DE | 102016225758 A1 | 6/2018 |

OTHER PUBLICATIONS

Wikipedia, Bandpass, 2018 Munich Germany.
German Office Action dated Jul. 15, 2019 for corresponding German Patent Application No. 10 2018 222 2495.

* cited by examiner

METHOD AND DEVICE FOR DIAGNOSIS OF A PARTICLE FILTER ARRANGED IN THE EXHAUST GAS SYSTEM OF A PETROL-OPERATED INTERNAL COMBUSTION ENGINE

CROSS-REFERENCE TO RELATED APPLICATION

This application claims the claims priority to German Application DE 10 2018 222 249.5, filed Dec. 19, 2018. The disclosures of the above application is incorporated herein by reference.

TECHNICAL FIELD

A method and a device for diagnosis of a particle filter arranged in the exhaust gas system of a petrol-operated internal combustion engine is disclosed.

BACKGROUND

Increasingly stricter legal emission limit values impose ever higher requirements on the exhaust gas systems of motor vehicles. In order to be able to meet such requirements, different exhaust gas emission reduction strategies must be applied simultaneously. These different exhaust gas emission reduction strategies use different components, each including associated sensors.

As well as the reduction in fuel consumption and hence $CO_2$ emissions, an essential development objective is to reduce the gaseous emissions of CO, $NO_x$ and HC by means of one or more exhaust gas catalytic converters, and to reduce particle emissions by means of particle filters.

Particle filters for diesel internal combustion engines, often also described as soot filters, have been in use for some time and proven successful in practice.

Furthermore, it is already known that particles also occur in the exhaust gas tract of a petrol-operated internal combustion engine, in particular with direct fuel injection in which the fuel is introduced directly into the combustion chambers under high pressure and very finely atomized. Therefore, legislators have also reduced the limit values for particle emissions from petrol-operated internal combustion engines with direct fuel injection. Thus, with the introduction of the Euro 6c emissions standard, the applicable limit value of maximum $6 \times 10^{12}$ particles/km must be observed.

The particle filters used for this substantially consist of a housing (or can) and a monolith inserted in the housing. This largely filters the particles, mainly soot particles occurring during combustion, out of the exhaust gas. The separated particles remain in the particle filter, as long as the conditions prevailing in the particle filter, e.g. for example high temperature, oxygen in the exhaust gas, do not lead to regeneration of the particle filter.

It may occur that the particle filter either has not been installed, or has been removed later, or the housing of the particle filter has been installed but the monolith(s) removed in order to at least give the optical impression that an operable particle filter is present.

Since the particle filter is an emission-relevant component in the same way as the exhaust gas catalytic converter and exhaust gas sensors, legislators require the reliable detection of an uninstalled or absent filter monolith of the particle filter in the context of on-board diagnosis.

Previous methods for checking the installation of a particle filter have been based on evaluation of the temporal development of temperatures upstream and downstream of the particle filter. Also, installation checks are possible which are based on analysis of the temporal gradients of the differential pressure. Since the differential pressures across a particle filter are typically very small, in contrast to differential pressures over a diesel particle filter, this method is usually relatively inaccurate.

DE 10 2016 225 758 A1 discloses a method and a device for monitoring a particle filter arranged in the exhaust gas system of an internal combustion engine, which also allow checking of whether a monolith is present in the housing of the particle filter or has been removed. Here, the pressure measurement signals provided by a secondary air pressure sensor of the internal combustion engine are evaluated. In the context of monitoring the particle filter, a pressure signal curve determined from the output signals of the secondary air pressure sensor is compared with a pressure signal curve from a secondary air pressure model, and if the pressure values of the pressure signal curve determined using the pressure measurement signals provided by the secondary air pressure sensor are lower than the pressure values of the pressure signal curve from the secondary air pressure model, it is detected that there is no monolith in the housing of the particle filter. If the pressure values of the pressure signal curve determined using the pressure measurement signals provided by the secondary air pressure sensor correspond to the pressure values of the pressure signal curve of the secondary air pressure model, it is detected that a monolith not loaded with particles is present in the housing of the particle filter.

DE 10 2011 002 438 A1 describes a method and a device for determining the load of a particle filter in the exhaust gas duct of an internal combustion engine, wherein by means of a pressure increase device, a gas stream may be introduced into the exhaust gas tract upstream of the particle filter, wherein a first pressure sensor upstream of the particle filter determines the gas pressure, wherein to determine the load on the particle filter, by means of the pressure increase device, a gas stream is introduced into the exhaust gas duct upstream of the particle filter, wherein the load is determined from the difference in gas pressures upstream and downstream of the particle filter. The pressure increase device here is a secondary air pump. Also, incorrect installation or absence of the particle filter can be detected since the difference in gas pressures upstream and downstream of the particle filter allows a conclusion about its correct installation.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method and a device is provided with which the presence or absence of a particle filter, correctly arranged in the exhaust gas system of a petrol-operated internal combustion engine, can be reliably checked.

According to the present disclosure, a method for determining a correct presence of a particle filter in the exhaust gas tract of a petrol-operated internal combustion engine comprises the following steps: determining a measured differential pressure curve from a first pressure curve measured in the exhaust gas tract using a first pressure sensor arranged upstream of an installation position of the particle filter, and a second pressure curve measured in the exhaust gas tract using a second pressure sensor arranged downstream of an installation position; determining a first result curve by means of a first low-pass filtration of the measured differential pressure curve; determining a second result curve by means of a second low-pass filtration of the first result curve; determining a first differential result curve by forming the difference between the first result curve and the second result curve; determining a first amount result curve by forming the amount of the first differential result curve; determining an expected differential pressure curve; determining a third result curve by means of a first low-pass filtration of the expected differential pressure curve; determining a fourth result curve by means of a second low-pass filtration of the third result curve; determining a second differential result curve by forming the difference between the third result curve and the fourth result curve; determining a second amount result curve by forming the amount of the second differential result curve; integrating the first amount result curve into a first sum result and the second amount result curve into a second sum result when a first threshold value is exceeded by the third result curve and/or the fourth result curve and/or the second amount result curve; evaluating the first sum result and the second sum result in order to determine the correct presence of the particle filter.

The installation position is the position in the exhaust gas tract in which the particle filter is to be arranged. A position upstream of the installation position of the particle filter is any position which lies upstream of the particle filter in the flow direction of the exhaust gas of the internal combustion engine. According to one embodiment, for example an exhaust gas catalytic converter is arranged upstream of the installation position of the particle filter. Accordingly, the exhaust gas first flows through the exhaust gas catalytic converter and then through the particle filter. A position downstream of the installation position of the particle filter lies downstream of the particle filter in the flow direction of the exhaust gas of the internal combustion engine.

The first pressure curve is the curve of the pressure of the exhaust gas upstream of the installation position of the particle filter. According to one embodiment, directly upstream of the particle filter, for example between the exhaust gas catalytic converter and the particle filter. Accordingly, the first pressure sensor is arranged in the exhaust gas tract between the exhaust gas catalytic converter and the particle filter, such that it can determine the pressure of the exhaust gas at this position.

The second pressure curve is a curve of the pressure of the exhaust gas downstream of the installation position of the particle filter, according to one embodiment directly downstream of the particle filter. The second pressure curve is determined by means of the second pressure sensor. For this, the second pressure sensor is arranged in the exhaust gas tract downstream of the installation position of the particle filter and detects the pressure of the exhaust gas flowing by.

The pressure detection by the first pressure sensor and/or the second pressure sensor may take place for example discretely, at predefined time intervals, or continuously, i.e. cohesively without gaps, over a specific time period. If the pressure is detected discretely, the curve of the individually detected pressures can be combined into the desired pressure curve for example using various mathematical approaches.

The differential pressure curve is the difference between the first pressure curve and the second pressure curve, or between the second pressure curve and the first pressure curve. It is also conceivable that a so-called differential pressure sensor is arranged in the exhaust gas tract, which detects the pressure upstream of the installation position of the particle filter by means of a first assembly of the differential pressure sensor, and detects the pressure of the exhaust gas downstream of the installation position of the particle filter by means of a second assembly of the differential pressure sensor, and internally from this automatically determines the differential pressure or pressure curve over a specific time.

The first result curve is determined in that a low-pass filtration is carried out on the measured differential pressure curve determined by means of the first pressure sensor and the second pressure sensor. The second result curve is determined in that a second low-pass filtration is performed on the first result curve. In low-pass filtration, signal proportions with frequencies below a limit frequency can pass almost unattenuated, while proportions with higher frequencies are damped.

The first differential result curve is determined in that the difference between the first result curve and the second result curve is formed. According to one embodiment, the second result curve is deducted from the first result curve.

The first amount result curve is determined in that the amount of the first differential result curve is formed. The amount of a curve is determined in that the prefix is omitted. If a portion of the curve is positive, the amount of the curve is simply the curve itself. If the portion of the curve is negative, the amount of the portion is the negative of this negative portion. The negative portion of the curve is consequently reflected into the positive by forming the amount about the x-axis.

The expected differential pressure curve, according to one embodiment, is the pressure curve which is expected at the time at which the measured differential pressure curve is measured. The expected differential pressure curve may for example be modeled or calculated using parameters of the internal combustion engine.

The third result curve is determined in that the expected differential pressure curve is low-pass filtered. The fourth result curve is determined in that the third result curve is low-pass filtered. The second differential result curve is determined in that the difference between the third result curve and the fourth result curve is formed. According to one embodiment, the fourth result curve is deducted from the third result curve.

The second amount result curve is determined in that the amount of the second differential result curve is formed. With respect to the definition of forming the amount, see above.

Then the first amount result curve is integrated into a first sum result and the second amount result curve is integrated into a second sum result if a first threshold value is exceeded by the third result curve and/or the fourth result curve and/or the second amount result curve. Integration of the first amount result curve and the second amount result curve consequently begins only when the condition is fulfilled that the first threshold value is exceeded by the third result curve and/or the second result curve and/or the second amount result curve. Consequently, a first sum result is calculated according to the curve of the first amount result curve, and the second sum result is calculated according to the curve of the second amount result curve.

The sum results are values which can easily be compared with each other, in particular because a longer period is considered. Then to determine the presence of the particle filter, the first sum result and the second sum result are evaluated. Here for example, the first sum result and the second sum result may be compared with each other. If the comparison does not correspond to the expected value, it can be concluded that the particle filter is not correctly installed in the installation position.

According to one embodiment, the particle filter comprises a housing and at least one monolith. The pressurized exhaust gas flows through the particle filter, in particular through the monolith, and in so doing loses a specific pressure. The first sum result is a result which is composed of the first pressure curve measured in the exhaust gas tract and the second pressure curve measured in the exhaust gas tract. The first measured pressure curve is the curve upstream of the installation of the particle filter, and the second measured pressure curve is the curve downstream of the installation position of the particle filter. A pressure change in the exhaust gas pressure upstream of the installation position of the particle filter relative to the exhaust gas pressure downstream of the particle filter is accordingly reflected in the first sum result. Because of the method steps according to the invention, such a pressure change is reflected particularly strongly in the first sum result, and can consequently be identified clearly. Accordingly, the first sum result indicates the extent of a pressure fall caused by the particle filter.

The second sum result is a result which is expected for example because of specific operating parameters of the internal combustion engine. For example, the rotation speed of the internal combustion engine may influence the second sum result.

Accordingly, the first sum result can be reliably and easily compared with the second sum result in order to establish whether a particle filter is correctly installed in the installation position. If the first sum result substantially corresponds to the second sum result, it can be concluded that a particle filter is correctly installed in the installation position. If the first sum result differs greatly from the second sum result, it can be concluded that a particle filter is not correctly installed in the installation position of the particle filter.

A correct particle filter may be a particle filter which filters the required number of particles from the exhaust gas of the exhaust gas tract. An incorrect particle filter installation may for example comprise the monolith having been removed completely or partially from the housing of the particle filter, or the entire particle filter having been removed from the exhaust gas tract. An incorrect particle filter may for example also be a non-functioning one, i.e. the particle filter does not filter any particles or does not filter the required number of particles from the exhaust gas.

Accordingly, it can be determined from the first sum result and the second sum result whether the particle filter is correctly installed in the installation position. The first sum result and the second sum result are determined over a specific period. Accordingly, a longer period is evaluated in order to check whether or not a particle filter is correctly installed. In particular therefore, it can be determined whether the particle filter is correctly installed in the installation position. Temporary measurement errors can be compensated and do not falsify, or only very slightly falsify, the result.

In addition, measurement errors can be avoided since the integration of the first amount result curve and second amount result curve only begins as soon as the first threshold value exceeded by the third result curve and/or the fourth result curve and/or the second amount result curve. Such measurement errors may for example occur in particular on start-up of the internal combustion engine. If the process were to start directly after start-up of the internal combustion engine, any measurement errors occurring could falsify the evaluation. This can be avoided as discussed herein Overall, in this way the method for determining the presence of the particle filter operates even under allegedly difficult conditions, such as for example on start-up of the internal combustion engine or at relatively low or high ambient temperatures.

According to an embodiment, the expected differential pressure curve is determined depending on an exhaust gas volume flow in the exhaust tract. A volume flow indicates how much volume of a medium is transported through an established cross-section per time interval. The exhaust gas volume flow is accordingly the volume of exhaust gas which is transported through the exhaust gas tract per time interval. The exhaust gas volume flow depends on the operating parameters of the internal combustion engine, such as for example the rotation speed. The pressure fall of the exhaust gas through the particle filter may accordingly depend on the exhaust gas volume flow. If, accordingly, the expected differential pressure curve is determined depending on the exhaust gas volume flow, it can additionally be determined whether the particle filter is correctly installed in the installation position.

According to one embodiment, the expected differential pressure curve is determined by means of a polynomial approach or by means of a characteristic curve which is stored in a memory of an engine control unit. It is conceivable that the expected differential pressure curve is determined by means of a polynomial approach by a calculation unit, for example an engine control unit, which for example additionally takes account of parameters of the internal combustion engine. It is also conceivable that the expected differential pressure curve is calculated by means of the curve stored in the memory of the calculation unit. For example, additional parameters of the internal combustion engine may be taken into account in determination of the expected differential pressure curve based on the characteristic curve. If the expected differential pressure curve is determined by means of the polynomial approach or by means of a characteristic curve, this constitutes a simple method of determining the expected differential pressure curve. Thus in particular, it can be determined whether the particle filter is correctly installed in the installation position.

According to one embodiment, the integration of the first amount result curve and second amount result curve begins when the second amount result curve exceeds the first threshold value and the third result curve exceeds a second threshold value. Accordingly, two conditions must be fulfilled in order for integration of the first amount result curve and integration of the second amount result curve to begin. According to one embodiment, the first threshold value indicates a pressure change value which must be exceeded so that the evaluation can be reliably performed. According to a further embodiment, the second threshold value indicates a minimal differential pressure level which must be exceeded so that the evaluation can be reliably performed.

According to one embodiment, the integration of the first amount result curve and second amount result curve ends after a predefined time period, wherein the predefined time period begins as soon as the integration begins. The predefined time period may for example be stored in the memory of the engine control unit. Thus, it is possible always to integrate over precisely the same time period, so that comparison of the first sum result and the second sum result is simple.

According to a further embodiment, the integration of the first result curve and of the first amount result curve and of the second amount result curve ends when the second amount result curve exceeds a third threshold value. It is conceivable that the third threshold value is stored in the memory of the engine control unit and compared with the second amount result curve. If it is found that the second amount result curve exceeds the third threshold value, integration of the first amount result curve and second amount result curve ends at the same time. In this way, it can be ensured that the first sum result and the second sum result, which were determined by integration of the first amount result curve and second amount result curve, can easily be compared. Thus, it can be evaluated whether the particle filter is correctly installed in the installation position.

According to one embodiment, a ratio of the first sum result and second sum result is determined in order to evaluate the first sum result and second sum result. The ratio of the first sum result and the second sum result gives a value which is easy to evaluate. This value may for example be compared with a comparison value stored in the memory of the engine control unit. Then from this comparison, it can easily be determined whether the particle filter is correctly installed in the installation position. According to one embodiment, the dividend of the ratio is the first sum result, and the divisor of the ratio is the second sum result. Because the ratio is determined, it can be evaluated in a particularly simple and reliable fashion whether the particle filter is correctly installed in the installation position.

According to a further embodiment, the ratio is determined with the second sum result as dividend and the first sum result as divisor. This constitutes a further possibility for simple evaluation of the first sum result and the second sum result.

According to one embodiment, the ratio is compared with a fourth threshold value, and it is detected that the particle filter is installed if the ratio exceeds the fourth threshold value. The fourth threshold value may for example be stored in the memory of the engine control unit and used for evaluation of the ratio. According to one embodiment, wherein the first sum result is the dividend of the ratio and the second sum result is the divisor of the ratio, the fourth threshold value is 1. If the first sum result determined from the measured differential pressure curve corresponds substantially to the second sum result determined from the expected differential pressure curve, the ratio of the two results is approximately 1. If the ratio lies above the fourth threshold value, which in this embodiment is 1, the differential pressure is adequate. From this, it can be concluded that the particle filter is correctly installed. If, according to this embodiment, the ratio lies below the fourth threshold value, it can accordingly be concluded that the particle filter is not correctly installed in the installation position. Thus, it is possible to determine the presence of the particle filter by means of this evaluation.

According to one embodiment, an entry is made in a fault memory if the evaluation of the first sum result and of the second sum result indicates that the particle filter is not correctly installed in the installation position. Because of the entry in the fault memory, it is comparatively easy to check, even at a later time, for example on servicing, whether the particle filter is correctly installed in the installation position. In this way, concealment of an absent particle filter can be avoided.

According to a further embodiment, a fault display device gives a signal if the evaluation of the first sum result and of the second sum result indicates that the particle filter is not correctly installed in the installation position. The fault display device is configured to indicate faults or problems to a driver. To this extent, it may be suitable for the fault display device to indicate to the driver that a particle filter is not correctly installed in the installation position.

According to a further embodiment, if the method determines that the particle filter is not correctly installed, a data transmission may take place to an authority or to the vehicle manufacturer in order to indicate to the authority or manufacturer that the particle filter is not correctly installed in the installation position of this exhaust gas tract.

Furthermore, a device is disclosed for determining a presence of a particle filter in the exhaust gas tract of a petrol-operated internal combustion engine, wherein the device has a control unit which is configured to control a method as described herein.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

An exemplary embodiment of the present disclosure is illustrated in the figures and will be explained in more detail with reference to the following description. The drawings show.

DETAILED DESCRIPTION

Figure 1:
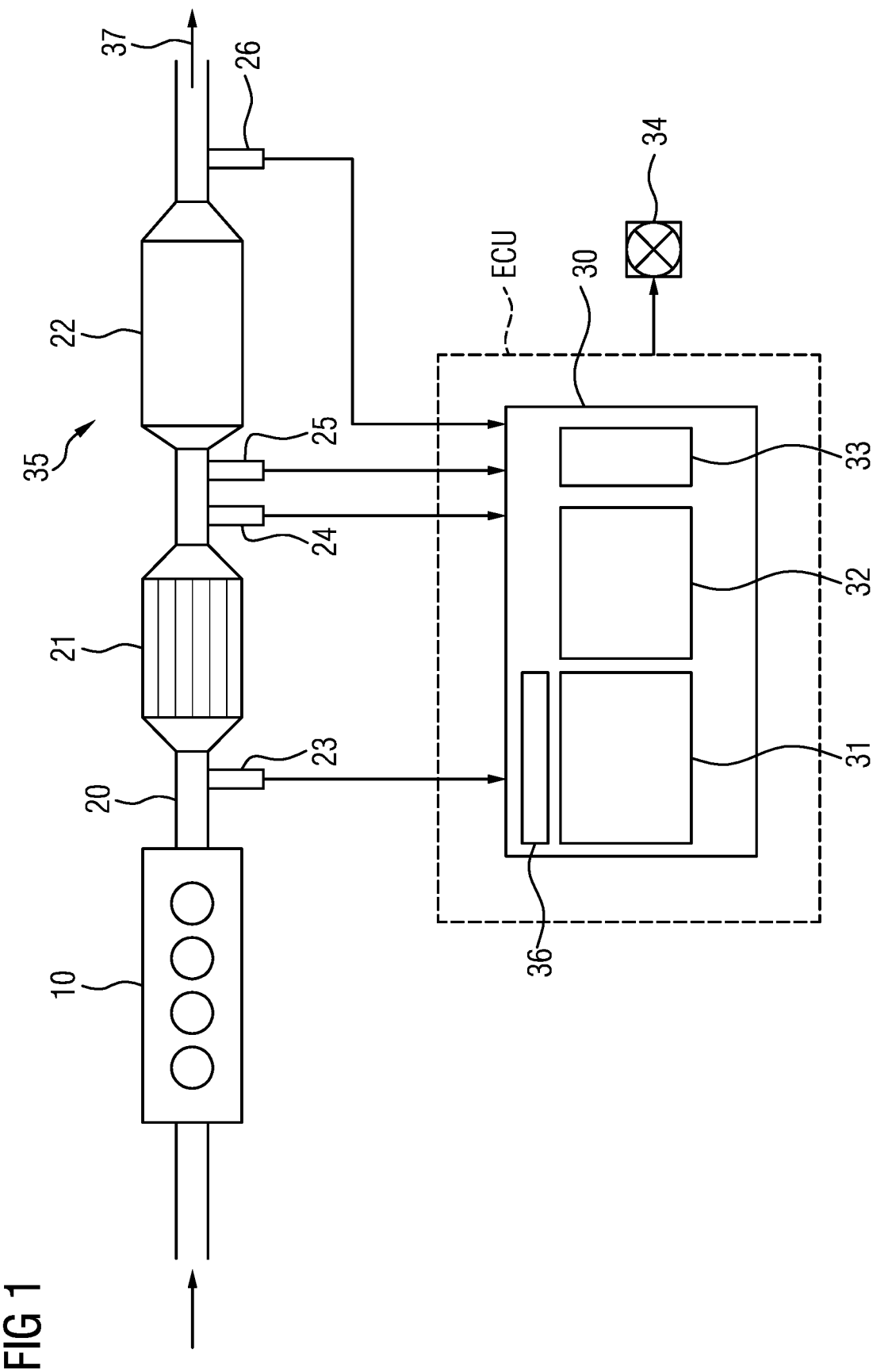
FIG. 1 diagrammatically, an internal combustion engine with associated exhaust gas aftertreatment system, FIG. 2 a block diagram with the individual method steps according to one embodiment, FIG. 3 a diagram of a pressure difference over a volume flow according to one embodiment.

FIG. 1 shows a block diagram of an internal combustion engine 10 with an exhaust gas tract 20. The exhaust gas tract 20 serves to discharge an exhaust gas 37 from at least one combustion chamber of the internal combustion engine 10 and after-treat the exhaust gas 37. Accordingly, the exhaust gas 37 flows through the exhaust gas tract 20. The exhaust gas tract 20 has an exhaust gas catalytic converter 21 and a particle filter 22 arranged downstream of the exhaust gas catalytic converter 21. Accordingly, the exhaust gas tract 20 comprises a first exhaust gas sensor 23 and a second exhaust gas sensor 24. The first exhaust gas sensor 23 is arranged upstream of the exhaust gas catalytic converter 21, and the second exhaust gas sensor 24 is arranged downstream of the exhaust gas catalytic converter 21. The first exhaust gas sensor 23 and the second exhaust gas sensor 24 are each configured to determine properties of the exhaust gas at the corresponding positions in the exhaust gas tract 20.

Also, the exhaust gas tract 20 comprises a first pressure sensor 25 and a second pressure sensor 26. The first pressure sensor is arranged upstream of an installation position 25 of the particle filter 22, and the second pressure sensor 26 is arranged downstream of the installation position 25 of the particle filter 22. The first pressure sensor 25 is configured to measure the pressure of the exhaust gas 37 upstream of the installation position 35 of the particle filter 22. The first pressure sensor 25 is accordingly configured to measure over a specific time a first pressure curve 110 which prevails upstream of the installation position 35 of the particle filter 22.

The second pressure sensor 26 is configured to measure the pressure of the exhaust gas 37 downstream of the installation position 35 of the particle filter 22. The second pressure sensor 26 is accordingly configured to measure over a specific time a second pressure curve 120 which prevails downstream of the installation position 35 of the particle filter 22.

FIG. 1 also shows an engine control unit ECU which has a control unit 30. The control unit 30 has a first block 31 for checking the presence of the particle filter, a block 32 containing a characteristic curve, and a fault memory 33.

FIG. 1 also shows a fault display device 34. The fault display device 34 is configured to display a fault which occurs for example on evaluation of the first sum result 170 and the second sum result 270. Accordingly, according to one embodiment, the fault display device 34 may indicate that no correct particle filter 22 is installed in the installation position 35.

The control unit 30 is accordingly configured to check the presence of the correct particle filter 22. For this, as indicated diagrammatically in FIG. 2, the first pressure curve 110 and the second pressure curve 120 are evaluated by the control unit 30 according to the second embodiment.

Figure 2:
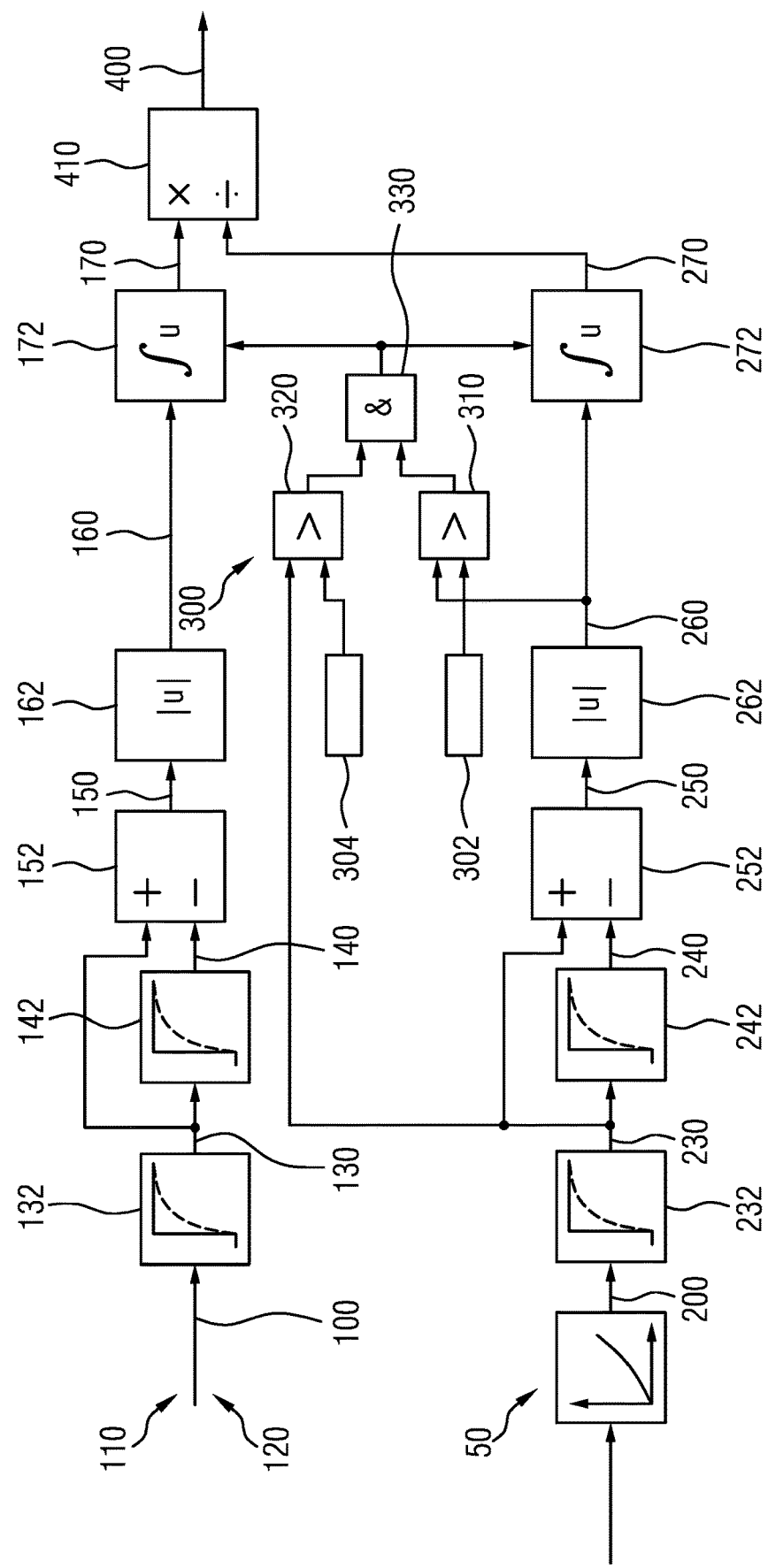

According to the embodiment shown in FIG. 2, the control unit 30 is configured to determine a measured differential pressure curve 100 from the first measured pressure curve 110 and the second measured pressure curve 120. For this, according to one embodiment, the first measured pressure curve 110 is deducted from the second measured pressure curve 120. Then the measured differential pressure curve is low-pass filtered. This gives a first result curve 130. Then the first result curve 130 is again low-pass filtered. This gives a second result curve 140. Then a first differential result curve 150 is determined in that the difference between the first result curve 130 and the second result curve 140 is formed. Then a first amount result curve 160 is determined in that the amount of the first differential result curve 150 is formed.

In addition, the control unit 30 is configured to provide an expected differential pressure curve 200. According to one embodiment, the expected differential pressure curve 200 may depend on various internal combustion engine parameters. Such a parameter may for example be an engine rotation speed. A third result curve 230 is determined from the expected differential pressure curve 200 in that the expected differential pressure curve 200 is low-pass filtered. Then a fourth result curve 240 is determined in that the third result curve 230 is low-pass filtered.

The control unit 30 is furthermore configured to determine a second differential result curve 250 in that the difference between third result curve 230 and the fourth result curve 240 is formed. Then a second amount result curve 260 is determined in that the amount of the second differential result curve 250 is formed. The control unit 30 is furthermore configured to determine a first sum result 170 by integration of the first amount result curve 160, and to determine a second sum result 270 by integration of the second amount result curve 260. The control unit 30 begins integration of the amount result curves 160, 260 only as soon as the second result curve 260 has exceeded a first threshold value 302 and the third result curve 230 has exceeded a second threshold value 304.

The control unit 30 is furthermore configured to evaluate the first sum result 170 and the second sum result 270. According to one embodiment, evaluation takes place by forming a ratio 400 of the first sum result 170 and the second sum result 270. According to one embodiment, the ratio 400 is determined with the first sum result 170 as dividend and the second sum result 270 as divisor.

According to one embodiment, the ratio 400 is compared with a fourth threshold value to establish whether the particle filter 22 is correctly installed in the installation position 35. According to one embodiment, the fourth threshold value may be 1.

According to one embodiment, integration of the first amount result curve 160 and second amount result curve 260 ends after a predefined time period. According to a further embodiment, this time period begins as soon as integration of the first amount result curve 160 and second amount result curve 260 begins.

According to another embodiment, the integration of the first amount result curve 160 and the second amount result curve 260 ends as soon as the second amount result curve 260 exceeds a third threshold value. The third threshold value and also the fourth threshold value may be stored in a memory 36 of the engine control unit ECU.

The individual method steps of the method shown in FIG. 2, for evaluation of whether or not a correct particle filter 22 is present in the exhaust gas tract 20 of a petrol-operated internal combustion engine 10, are explained in more detail below. The method is carried out using the control unit 30. For this, firstly the measured differential pressure curve 100 is determined from the first measured pressure curve 110 and the second pressure curve 120. Then by means of the first low-pass block 132, the measured differential pressure curve 100 is low-pass filtered to give the first result curve 130. Then by means of a second low-pass block 142, a second result curve 140 is determined in that the first result curve 130 is low-pass filtered. Then by means of a first difference block 152, the difference between the first result curve 130 and the second result curve 140 is formed. This gives the first differential result curve 150. Then the first differential result curve 150 is formed into the first amount result curve 160 by means of the first amount block 162.

At the same time, the expected differential pressure curve 200 is determined. The expected differential pressure curve 200 in one embodiment here depends on an exhaust gas volume flow 50. The expected differential pressure curve 200 is low-pass filtered in a third low-pass block 232 to give the third result curve 230. The third result curve 230 is low-pass filtered in a fourth low-pass block 242 to give a fourth result curve 240. A second difference block 252 then determines the second differential result curve 250 in that the difference between the third result curve 230 and the fourth result curve 240 is formed. A second amount block 262 then determines the second amount result curve 260 by forming the amount of the second differential result curve 250.

FIG. 2 also shows a condition block 300 which must be fulfilled in order for integration of the first amount result curve 160 and second amount result 260 to begin. The condition block 300 comprises a first comparison block 310 and a second comparison block 320. In order for the condition of the first comparison block 310 to be fulfilled, the second amount result curve 260 must exceed the first threshold value 302. In order for the condition of the second comparison block 320 to be fulfilled, the third result curve 230 must exceed the second threshold value 304. The condition block 300 in one embodiment is fulfilled if the condition of the first comparison block 310 and the condition of the second comparison block 320 are fulfilled. This is shown in FIG. 2 by means of a linking block 330.

If all conditions of the condition block 300 are fulfilled, integration of the first amount result curve 160 into the first sum result 170, and integration of the second amount result curve 260 into the second sum result 270 begin. FIG. 2 shows this by means of a first integration block 172 and a second integration block 272. In order to evaluate the first sum result 170 and second sum result 270, a ratio block 410 forms the ratio 400 of the first sum result 170 and the second sum result 270. Here, the first sum result 170 is the dividend of the ratio 400, and the second sum result 270 is the divisor of the ratio 400. According to one embodiment, the ratio 400 is then compared with the fourth threshold value in order to establish whether the particle filter 22 is correctly installed in the installation position 35.

Figure 3:
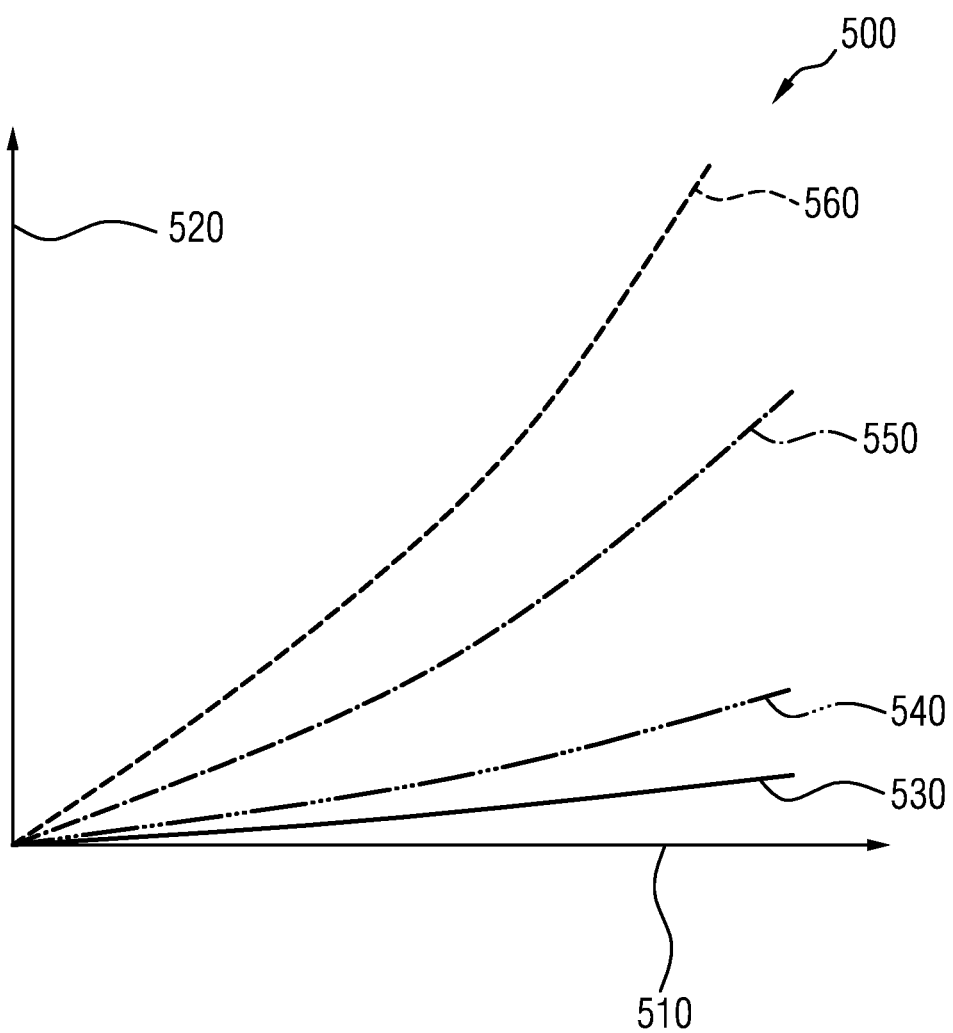

FIG. 3 shows a diagram 500, wherein the exhaust gas volume flow 50 is shown on the X-axis 510, and the differential pressure arising from the arrangement of the particle filter 22 in the exhaust gas tract 20 is shown on the Y-axis 520. A first curve 530 shows the differential pressure if the particle filter 22 or its monolith is missing. A second curve 540 shows the differential pressure if the particle filter 22 is installed in the installation position 35 and the same time is not loaded. Not loaded means that there is no soot and no ash in the particle filter; accordingly the particle filter is effectively new. A third curve 550 shows the differential pressure over the exhaust gas volume flow 50 if the particle filter 22 is correctly installed in the installation position 35 and loaded to the maximum extent. Loaded to the maximum extent means that the maximum permitted quantity of soot and the maximum permitted quantity of ash are present in the particle filter. A fourth curve 560 shows the differential pressure over the exhaust gas volume flow 50 when the particle filter 22 is clogged.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for determining a presence of a correct particle filter in an exhaust gas tract of a petrol-operated internal combustion engine, the method comprising:
    determining with a control unit a measured differential pressure curve from a first pressure curve measured in the exhaust gas tract using a first pressure sensor arranged upstream of an installation position of a particle filter, and a second pressure curve measured in the exhaust gas tract using a second pressure sensor arranged downstream of the installation position;
    determining with the control unit a first result curve with a first low-pass filtration of the measured differential pressure curve;
    determining with the control unit a second result curve with a second low-pass filtration of the first result curve;
    determining with the control unit a first differential result curve by forming a difference between the first result curve and the second result curve;
    determining with the control unit a first amount result curve by forming an amount of the first differential result curve;
    determining with the control unit an expected differential pressure curve;
    determining with the control unit a third result curve with a first low-pass filtration of the expected differential pressure curve;
    determining with the control unit a fourth result curve with a second-low-pass filtration of the third result curve;
    determining with the control unit a second differential result curve by forming a difference between the third result curve and the fourth result curve;
    determining with the control unit a second amount result curve by forming an amount of the second differential result curve;
    integrating the first amount result curve into a first sum result and the second amount result curve into a second sum result when a first threshold value is exceeded by at least one of the third result curve, the fourth result curve, and the second amount result curve;
    evaluating with the control unit the first sum result and the second sum result to determine the presence of the correct particle filter.

2. The method as claimed in claim 1, wherein the expected differential pressure curve is determined depending on an exhaust gas volume flow in the exhaust tract.

3. The method as claimed in claim 1, wherein the expected differential pressure curve is determined by means of a polynomial approach or by means of a characteristic curve which is stored in a memory of the control unit.

4. The method as claimed in claim 1, wherein the integration of the first amount result curve and the second amount result curve begins when the second amount result curve exceeds the first threshold value and the third result curve exceeds a second threshold value.

5. The method as claimed in claim 1, wherein the integration of the first amount result curve and the amount second result curve ends after a predefined time period, wherein the predefined time period begins as soon as the integration begins.

6. The method as claimed in claim 1, wherein the integration of the first amount result curve and the second amount result curve ends when the second amount result curve exceeds a third threshold value.

7. The method as claimed in claim 1, wherein to evaluate the first sum result and the second sum result, a ratio of the first sum result and the second sum result is determined.

8. The method as claimed in claim 7, wherein the ratio is determined with the first sum result as dividend and with the second sum result as divisor.

9. The method as claimed in claim 8, wherein the ratio is compared with a fourth threshold value, and detecting that the particle filter is correctly installed in the installation position if the ratio exceeds the fourth threshold value.

10. The method as claimed in claim 9, wherein the fourth threshold value is 1.

11. The method as claimed in claim 1, further comprising at least one of making an entry in a fault memory and emitting a signal from a fault display device occurs when an evaluation of the first sum result and of the second sum result indicates that the particle filter is not correctly installed in the installation position.

12. A device for determining a presence of a correct particle filter in an exhaust gas tract of a petrol-operated internal combustion engine, the device has a control unit which is configured for:

- determining a measured differential pressure curve from a first pressure curve measured in the exhaust gas tract using a first pressure sensor arranged upstream of an installation position of a particle filter, and a second pressure curve measured in the exhaust gas tract using a second pressure sensor arranged downstream of the installation position;
- determining a first result curve with a first low-pass filtration of the measured differential pressure curve;
- determining a second result curve with a second low-pass filtration of the first result curve;
- determining a first differential result curve by forming a difference between the first result curve and the second result curve;
- determining a first amount result curve by forming an amount of the first differential result curve;
- determining an expected differential pressure curve;
- determining a third result curve with a first low-pass filtration of the expected differential pressure curve;
- determining a fourth result curve with a second low-pass filtration of the third result curve;
- determining a second differential result curve by forming a difference between the third result curve and the fourth result curve;
- determining a second amount result curve by forming an amount of the second differential result curve;
- integrating the first amount result curve into a first sum result and the second amount result curve into a second sum result when a first threshold value is exceeded by at least one of the third result curve, the fourth result curve, and the second amount result curve; and
- evaluating the first sum result and the second sum result to determine the presence of the correct particle filter.

13. The device as claimed in claim 12, wherein the expected differential pressure curve is determined depending on an exhaust gas volume flow in the exhaust tract.

14. The device as claimed in claim 12, wherein the expected differential pressure curve is determined by a polynomial approach or by a characteristic curve which is stored in a memory of the control unit.

15. The device as claimed in claim 12, wherein the integration of the first amount result curve and the second amount result curve begins when the second amount result curve exceeds the first threshold value and the third result curve exceeds a second threshold value.

16. The device as claimed in claim 12, wherein the integration of the first amount result curve and the second amount result curve ends after a predefined time period, wherein the predefined time period begins as soon as the integration begins.

17. The device as claimed in claim 12, wherein the integration of the first amount result curve and the second amount result curve ends when the second amount result curve exceeds a third threshold value.

18. The device as claimed in claim 12, wherein to evaluate the first sum result and the second sum result, a ratio of the first sum result and the second sum result is determined.

19. The device as claimed in claim 18, wherein the ratio is determined with the first sum result as dividend and with the second sum result as divisor.

20. The device as claimed in claim 19, wherein the ratio is compared with a fourth threshold value, and wherein the control unit is configured for detecting that the particle filter is correctly installed in the installation position when the ratio exceeds the fourth threshold value.

21. The device as claimed in claim 12, wherein one of: an entry is made in a fault memory and a signal is emitted from a fault display device when an evaluation of the first sum result and of the second sum result indicates that the particle filter is not correctly installed in the installation position.

* * * * *